United States Patent
Tuyls et al.

(10) Patent No.: US 8,199,912 B2
(45) Date of Patent: Jun. 12, 2012

(54) SECURITY STORAGE OF ELECTRONIC KEYS WITHIN VOLATILE MEMORIES

(75) Inventors: Pim Tuyls, Mol (BE); Maarten Vertregt, Eindhoven (NL); Hans De Jong, Eindhoven (NL); Frans List, Eindhoven (NL); Mathias Wagner, Alvesen-Rosengarten (DE); Frank Zachariasse, Wijchen (NL); Arjan Mels, Wijchen (NL)

(73) Assignee: NXP B.V., Eindhoven (NL)

( * ) Notice: Subject to any disclaimer, the term of this patent is extended or adjusted under 35 U.S.C. 154(b) by 679 days.

(21) Appl. No.: 12/296,150

(22) PCT Filed: Feb. 15, 2007

(86) PCT No.: PCT/IB2007/050495
§ 371 (c)(1),
(2), (4) Date: Nov. 27, 2008

(87) PCT Pub. No.: WO2007/116325
PCT Pub. Date: Oct. 18, 2007

(65) Prior Publication Data
US 2009/0164699 A1    Jun. 25, 2009

(30) Foreign Application Priority Data

Apr. 10, 2006 (EP) .................................. 06112409
May 18, 2006 (EP) .................................. 06114136

(51) Int. Cl.
*H04L 9/00* (2006.01)
(52) U.S. Cl. ............ 380/44; 380/46; 380/277; 713/193; 711/102; 711/E12.001
(58) Field of Classification Search .................. 380/277, 380/44–46; 713/193; 711/102, E12.001
See application file for complete search history.

(56) References Cited

U.S. PATENT DOCUMENTS 4,685,056 A * 8/1987 Barnsdale et al. ............ 711/164
(Continued)

FOREIGN PATENT DOCUMENTS
WO    2005029402 A    3/2005

OTHER PUBLICATIONS

The Regents of the University of California; "Random C Source Code From the Freebsd Distribution". Internet Citation, Jan. 27, 2000, Retrieved From the Internet on Jan. 27, 2000, http://ninna.tom.sfc.keio.ac.jp/sa/sources/gawk-3.1.4/random.c.

*Primary Examiner* — Kambiz Zand
*Assistant Examiner* — Tongoc Tran

(57) ABSTRACT

It is described a method for providing an electronic key within an integrated circuit (100) including both a volatile memory (102) and a non-volatile memory (104). The described comprises starting up the integrated circuit (100), reading the logical state of predetermined data storage cells (102*a*) assigned to the volatile memory (102), which data storage cells (102*a*) are characterized that with a plurality of start up procedures they respectively adopt the same logical state, and generating an electronic key by using the logical state of the predetermined data storage cells (102*a*). Preferably, the predetermined data storage cells (102*a*) are randomly distributed within the volatile memory (102). It is further described an integrated circuit (100) for providing an electronic key. The integrated circuit (100) comprises a volatile memory (102) comprising predetermined data storage cells (102*a*), which are characterized that with a plurality of start up procedures they respectively adopt the same logical state, and a non-volatile memory (104) having information stored upon regarding the predetermined data storage cells (102*a*). Thereby, the electronic key is defined by the corresponding logical states of the predetermined data storage cells (102*a*).

9 Claims, 1 Drawing Sheet

U.S. PATENT DOCUMENTS

| | | | |
|---|---|---|---|
| 4,817,140 A * | 3/1989 | Chandra et al. | 705/55 |
| 5,301,231 A * | 4/1994 | Abraham et al. | 713/191 |
| 6,190,257 B1 * | 2/2001 | Takeda et al. | 463/29 |
| 6,581,841 B1 * | 6/2003 | Christoffersen | 235/492 |
| 6,588,672 B1 * | 7/2003 | Usami | 235/492 |
| 6,840,443 B2 * | 1/2005 | Azuma | 235/382 |
| 6,886,753 B2 * | 5/2005 | Azuma | 235/492 |
| 6,928,551 B1 | 8/2005 | Lee et al. | |
| 2002/0094086 A1 | 7/2002 | Grassmann et al. | |
| 2003/0163717 A1 * | 8/2003 | Yoshimoto et al. | 713/193 |
| 2005/0201558 A1 | 9/2005 | Watanabe et al. | |
| 2007/0101158 A1 * | 5/2007 | Elliott | 713/193 |
| 2008/0114993 A1 * | 5/2008 | Shankar et al. | 713/193 |

* cited by examiner

SECURITY STORAGE OF ELECTRONIC KEYS WITHIN VOLATILE MEMORIES

FIELD OF THE INVENTION

The present invention relates to the field of storing electronic keys within electronic communication devices. In particular the present invention relates to a method for providing an electronic key with an integrated circuit including both a volatile memory and a non-volatile memory.

The present invention further relates to an integrated circuit for providing an electronic key.

BACKGROUND OF THE INVENTION

Due to the increased influence of electronic communication on the modern life, attacks on secrete data have become to a more and more serious problem. In order to protect against data attacks electronic keys are used. Such a key has to be known until a restricted area within a data storage device becomes accessible for a user e.g. by opening a data connection via a computer network such as the internet.

In order to repeatedly use an electronic key it is known to store such keys on non-volatile memories such as e.g. a read only memory (ROM) or an electrically erasable programmable read only memory (EEPROM). However, hackers frequently attack data storage devices including such memories for gleaning electronic keys. Therefore, it is extremely important to provide an electronic key storage, which has to withstand many invasive and non-invasive hacker attacks.

OBJECT AND SUMMARY OF THE INVENTION

There may be a need for a secure data protection in particular for electronic keys, which are stored in memories.

This need may be met by the subject matter according to the independent claims. Advantageous embodiments of the present invention are described by the dependent claims.

According to an aspect of the invention there is described a method for providing an electronic key within an integrated circuit including both a volatile memory and a non-volatile memory. The described method comprises (a) starting up the integrated circuit, (b) reading the logical state of predetermined data storage cells assigned to the volatile memory, which data storage cells are characterized that with a plurality of start up procedures they respectively adopt the same logical state, and (c) generating an electronic key by using the logical state of the predetermined data storage cells.

This aspect of the invention is based on the idea that for a secure data communication it is not necessary that the electronic key is permanently existent within the integrated circuit. According to the provided method the electronic key is only generated when the key is needed, i.e. when the integrated circuit is started up. The electronic key is automatically destroyed after the integrated circuit is shut down. Therefore, the key is only available in the volatile memory for a relatively short time such that the provided method represents an effective counter-measure against many types of hacker attacks.

The provided method has the advantage that the key comprises a random sequence of logical states, which random sequence cannot be anticipated. The random sequence is based on the matter of fact that during a semiconductor manufacturing process these predetermined data storage cells will be randomly spread over the non-volatile memory. However, since all predetermined data storage cells have their own specific environment within the integrated circuit their startup logical state will be stable within a plurality of different start up procedures. Therefore, the generated electronic key will be very robust even when the integrated circuit is operated over a wide range of voltage and temperature variations.

According to an embodiment of the present invention the method further comprises using a helper dataset stored in the non-volatile memory, wherein the helper dataset comprises information indicating the predetermined data storage cells. Preferably, the helper dataset comprises pointers, which directly or indirectly indicate the location of the predetermined data storage cells. Since the predetermined data storage cells always adopt the same logical state, hereinafter they will also be designated as stable data storage cells.

The use of the described helper data has the advantage that the electronic key, which is not existent when the integrated circuit is switched off, may be reconstructed very easily.

According to a further embodiment of the invention the method further comprises using a further helper dataset stored in the non-volatile memory, wherein the further helper dataset comprises further information indicating at least some non-stable data storage cells assigned to the volatile memory. Thereby, the non-stable data storage cells are characterized that with a plurality of start up procedures they respectively adopt randomly different logical states.

This has the advantage that the non-volatile memory comprises also information regarding a further key. This further key will also be generated when the integrated circuit is started up. However, the further key strongly depends on the noise of the non-stable data storage cells. Therefore, since this further key is not stable it cannot be used for a protected data communication. However, the existence of this further key makes it much more difficult for hackers to find out the relevant key stored in the predetermined data storage cells. In particular, it will be very difficult for hackers to separate the information regarding the relevant key from the further information regarding the further key within the time period during which the integrated circuit is switched on.

According to a further embodiment of the invention the method further comprises destroying the electronic key after it has been used. This provides the advantage that the electronic key may be destroyed in particular even before the integrated circuit is shut down. Therefore, the duration of time during which the relevant electronic key is existent can be further reduced such that successful hacker attacks will be even less likely.

According to a further embodiment of the invention the method further comprises identifying the predetermined data storage cells by means of a training procedure. During such a training procedure the integrated circuit is started up several times. Thereby, it is tested which data storage cells are stable, i.e. which data storage cells adopt always the same logical state, and which data storage cells are not stable, i.e. which data storage cells adopt randomly different logical states.

The described training procedure may be carried out already immediately after the integrated circuit has been manufactured. In particular, the training procedure may be carried out under different operating conditions such as various temperatures and/or various voltage levels of supply voltages and data input voltages. This has the advantage that the most stable data storage cells may be identified such that these most stable cells are used for generating the relevant electronic key.

According to a further embodiment of the invention the predetermined data storage cells are randomly distributed within the volatile memory. A spatial random distribution of the predetermined respectively the stable data storage cells used for the relevant key has the advantage that hacker attacks are made even more difficult because it is very complicated to spatially identify the predetermined data storage cells within the volatile memory.

The spatial distribution may be determined by selecting the predetermined data storage cells from a number of stable data storage cells, which have been identified by means of the above-described training procedure.

According to a further aspect of the invention there is provided an integrated circuit for providing an electronic key, the integrated circuit comprises (a) a volatile memory comprising predetermined data storage cells, which are characterized that with a plurality of start up procedures they respectively adopt the same logical state, and (b) a non-volatile memory having information stored upon regarding the predetermined data storage cells. Thereby, the electronic key is defined by the logical state of the predetermined data storage cells.

This aspect of the invention is also based on the idea that it is not necessary that the electronic key is permanently existent within the integrated circuit. Rather, the electronic key may only be generated when the key is needed, i.e. when the integrated circuit is started up. The electronic key is automatically destroyed after the integrated circuit is shut down. Therefore, the key is only available in the volatile memory for a relatively short time such that the provided integrated circuit is insensitive to computer hacker attacks.

The predetermined data storage cells may be represented by flip-flops such that the described integrated circuit may be realized with many different types of volatile memories.

Since within the volatile memory all predetermined data storage cells have their own specific semiconductor environment, their startup logical state will be unchanged within a plurality of different start up procedures. Therefore, the generated electronic key will be very robust even when the integrated circuit is operated over a wide range of voltage and temperature variations.

Preferably, the information regarding the predetermined data storage cells is stored by means of a so-called helper data set, which comprises links or pointers to the individual locations of the predetermined data storage cells.

According to an embodiment of the invention (a) the volatile memory comprises non-stable data storage cells, which are characterized that with a plurality of start up procedures they respectively adopt randomly different logical states, and (b) the non-volatile memory have further information stored upon regarding the non-stable data storage cells. Preferably, the further information is stored by means of a so-called further or additional helper data set, which also comprises links or pointers to the individual locations of the predetermined data storage cells.

As has already been described above the non-volatile memory comprises also additional information regarding a further key, which will also be automatically generated when the integrated circuit is started up. However, this further key strongly depends on statistical fluctuations respectively the noise of the non-stable data storage cells. Therefore, the further key is not stable and it cannot be used for coding data. However, the existence of this further key makes it much more confusing for hackers to find out the relevant stable data storage cells representing the relevant stored key.

According to a further embodiment of the invention the non-volatile memory comprises a ROM, a PROM, an EPROM, an EEPROM and/or a Flash memory. This has the advantage that the integrated circuit for providing a secure electronic key may be realized by means of common known non-volatile memories.

According to a further embodiment of the invention the volatile memory comprises a RAM, a DRAM, and/or a SRAM. This has the advantage that the integrated circuit for providing a secure electronic key may be realized by means of common known volatile memories.

It has to be pointed out that experiments carried out by the inventors revealed that when SDRAM memories are used the start up logical states are stable within an in particular wide range of voltage variations and temperature variations.

According to a further embodiment of the invention the predetermined data storage cells are randomly distributed within the volatile memory. As has already been pointed out above in connection with a preferred embodiment of the method for providing an electronic key within an integrated circuit the spatial random distribution of the predetermined data storage cells has the advantage that successful hacker attacks get more complicated.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DESCRIPTION OF EMBODIMENTS

Figure 1:
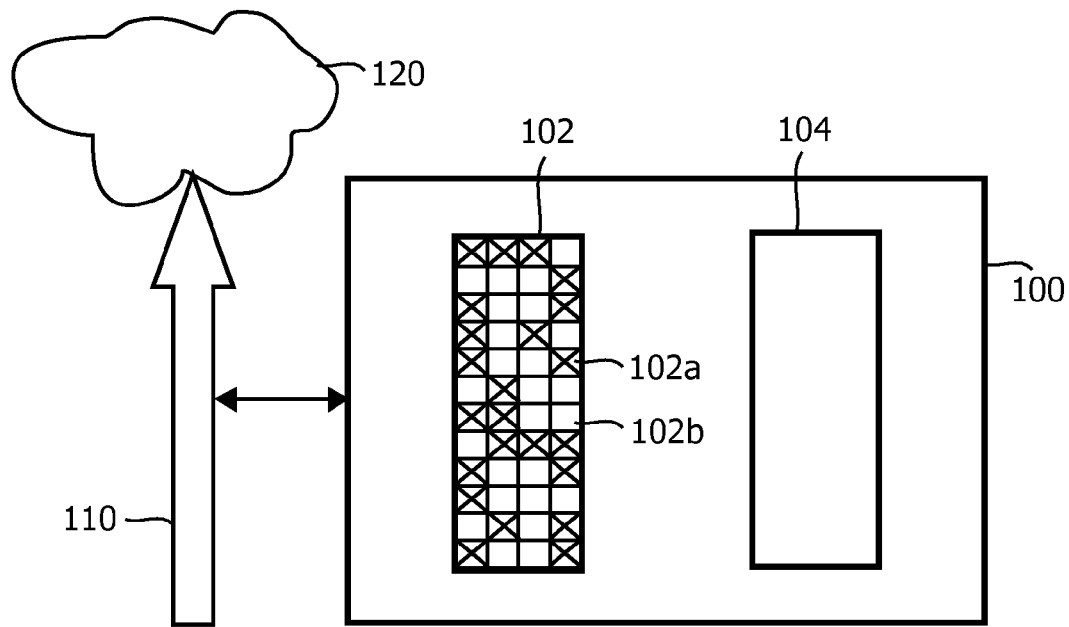
FIG. 1 shows a schematic diagram depicting an integrated circuit according to a preferred embodiment of the invention.

As can be seen from FIG. 1, an integrated circuit 100 according to an embodiment of then invention comprises a volatile memory 102, e.g. a random access memory (RAM). The memory 102 itself comprises a plurality of data storage cells, which preferably are realized by means of flip-flops. The data storage cells are divided into different types of data storage cells. First there are predetermined data storage cells or stable data storage cells 102a. These predetermined data storage cells 102a are characterized that with a plurality of start up procedures they respectively adopt the same logical state. Second there are provided non-stable data storage cells 102b. The non-stable data storage cells 102b are characterized that with a plurality of start up procedures they respectively adopt randomly different logical states.

In order to find out whether a particular data storage cell is a stable or alternatively a non-stable cell a training procedure may be carried out. Thereby, the integrated circuit is started up several times and it is tested which data storage cells always adopt the same logical value. These data cells are called stable data storage cells. Of course, it is also detected which data storage cells are not stable. In order to find out which data storage cells are the most stable ones the training procedure may be carried under different environment operating conditions such as various temperatures and various voltage levels.

The integrated circuit 100 further comprises a non-volatile memory 104, e.g. a read only memory (ROM) or an electrically erasable programmable read only memory (EEPROM). The memory 104 stores so-called helper data. These helper data include information, which data storage cells are stable data storage cells 102a. This information is preferably lodged by means of appropriate pointers.

According to the embodiment described herewith, the memory 104 further stores so-called additional helper data. These additional helper data include information, which data storage cells are non-stable data storage cells 102b. Also this information may be lodged by means of appropriate pointers.

The integrated circuit 100 is coupled to a communication network like, e.g. the internet. This coupling may be achieved by means of a data bus 110. Therefore, a user or any other communication device may communicate with the integrated circuit 100.

However, in order to communicate with the integrated circuit 100 an electronic key has to be known, which is temporarily stored in the volatile memory 102. This key is defined by the logical states of at least some of the predetermined data storage cells 102a. In the following there will be described a procedure how this electronic key is generated and temporarily stored in the volatile memory 102.

Figure 2:
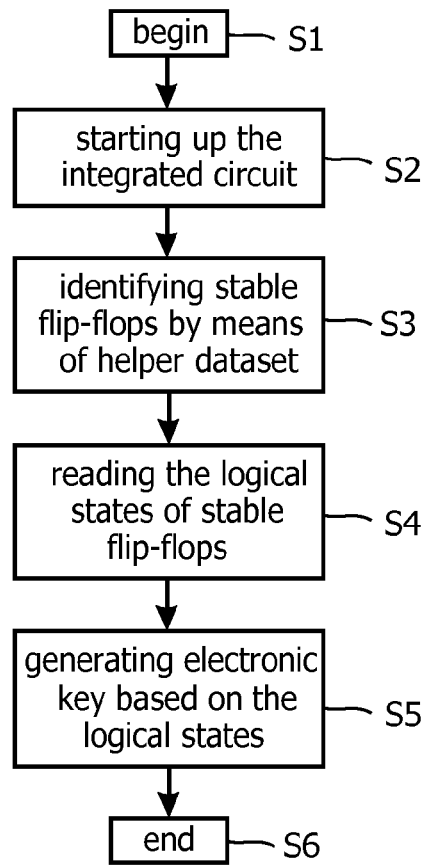
FIG. 2 shows a flow chart on a method for providing an electronic key within an integrated circuit according to a preferred embodiment of the invention.

FIG. 2 shows a flow chart on such a method for providing an electronic key within an integrated circuit. The method starts with a step S1. The described method continues with step S2.

In step S2 the integrated circuit is started up. Thereby, each data storage cell within the volatile memory 102 adopts a certain logical level which is represented by "0" and "1" f. The described method continues with step S3.

In step S3 a so-called helper dataset is loaded from the non-volatile memory 104. This helper dataset comprises a plurality of pointers each indicating at least one stable flip-flop 102a. The described method continues with step S4.

In step S4 the logical state of at least some of the predetermined stable flip-flops 102a is read out. The described method continues with step S5.

In step S5 an electronic key is generated based on the logical values, which have been read out before from the predetermined data storage cells 102a. Now, the electronic key can be used for a secure data communication.

In this respect it is apparent that this electronic key is not existent when the volatile memory 102 is not powered. In order to reduce the risk that the electronic key may be spied out the key can be deleted after it has been used. However, at the latest the key is automatically deleted when the integrated circuit 100 will be shut down.

Finally, the method ends with a step S6.

It has to be noted that by following a rather simple but effective counter-measure against hacker attacks one can further reduce the risk that during operation of the integrated circuit the temporarily stored key can be spied out. According to this counter-measure only some of the stable data storage cells 102a are used, whereby the used stable data storage memories 102a are randomly distributed within the volatile memory 102. Such a spatial random distribution of the predetermined stable data storage cells 102a makes it even more complicated to spatially identify the used stable data storage cells 102a within the volatile memory 102.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS

100 integrated circuit
102 volatile memory/RAM
1102a predetermined data storage cells/stable data storage cells
102b non-stable data storage cells
104 non-volatile memory/ROM/EEPROM
110 data bus
120 communication network
S1 step 1
S2 step 2
S3 step 3
S4 step 4
S5 step 5
S6 step 6

The invention claimed is:

1. A method for providing an electronic key within an integrated circuit including both a volatile memory and a non-volatile memory, the method comprising
   starting up the integrated circuit,
   reading the logical state of predetermined data storage cells assigned to the volatile memory, which data storage cells are characterized that with a plurality of start up procedures they respectively adopt the same logical state, and
   generating an electronic key by using the logical state of the predetermined data storage cells;
   wherein the predetermined data storage cells are randomly distributed within the volatile memory, wherein the random distribution is a spatial random distribution within the volatile memory.

2. The method according to claim 1, further comprising using a helper dataset stored in the non-volatile memory, wherein the helper dataset comprises information indicating the predetermined data storage cells.

3. The method according to claim 1, further comprising using a further helper dataset stored in the non-volatile memory, wherein the further helper dataset comprises further information indicating at least some non-stable data storage cells assigned to the volatile memory, which non-stable data storage cells are characterized that with a plurality of start up procedures they respectively adopt randomly different logical states.

4. The method according to claim 1, further comprising destroying the electronic key after it has been used.

5. The method according to claim 1, further comprising identifying the predetermined data storage cells by means of a training procedure.

6. An integrated circuit for providing an electronic key, the integrated circuit comprising
   a volatile memory comprising predetermined data storage cells, which are characterized that with a plurality of start up procedures they respectively adopt the same logical state, and
   a non-volatile memory having information stored upon regarding the predetermined data storage cells,
   wherein the electronic key is defined by the logical state of the predetermined data storage cells; and wherein the predetermined data storage cells are randomly distributed within the volatile memory, wherein the random distribution is a spatial random distribution within the volatile memory.

7. The integrated circuit according to claim 6, wherein the volatile memory comprises non-stable data storage cells, which are characterized that with a plurality of start up procedures they respectively adopt randomly different logical states, and the non-volatile memory have further information stored upon regarding the non-stable data storage cells.

8. The integrated circuit according to claim 6, wherein the non-volatile memory comprises a ROM, a PROM, an EPROM, an EEPROM and/or a Flash memory.

9. The integrated circuit according to claim 6, wherein the volatile memory comprises a RAM, a DRAM, and/or a SRAM.

\* \* \* \* \*